United States Patent [19]

Neuhoff et al.

[11] Patent Number: 4,824,463
[45] Date of Patent: Apr. 25, 1989

[54] PROCESS FOR CERAMISING GLASS-CERAMIC SHEETS

[75] Inventors: Eckard Neuhoff, Taunusstein-Bleidenstadt; Friedrich-Georg Schröder-Gerlach, Ingelheim, both of Fed. Rep. of Germany

[73] Assignee: Schott Glaswerke, Fed. Rep. of Germany

[21] Appl. No.: 93,190

[22] Filed: Sep. 4, 1987

[30] Foreign Application Priority Data

Sep. 20, 1986 [DE] Fed. Rep. of Germany ....... 3632085

[51] Int. Cl.⁴ .............................................. C03B 29/00
[52] U.S. Cl. .......................................... 65/33; 65/30.1; 65/91
[58] Field of Search ...................... 65/17, 30.1, 33, 91, 65/96, 106

[56] References Cited

U.S. PATENT DOCUMENTS

| | | | |
|---|---|---|---|
| 1,833,240 | 11/1931 | Reis | 65/96 |
| 1,848,117 | 3/1932 | Drake | 65/96 |
| 3,811,852 | 5/1974 | Bondarev et al. | 65/33 |
| 3,891,456 | 10/1974 | Bondarev et al. | 65/33 |
| 3,896,101 | 11/1974 | Gaskell et al. | 65/33 |
| 4,218,512 | 8/1980 | Auersma | 65/33 |
| 4,612,030 | 9/1986 | Smids | 65/91 |

FOREIGN PATENT DOCUMENTS 319557  12/1971  U.S.S.R. .................... 65/33

Primary Examiner—Arthur Kellogg
Attorney, Agent, or Firm—Frank P. Presta

[57] ABSTRACT

A process and apparatus for ceramising planar, transparent, substantially-rectangular sheets of glass-ceramic characterized in that the sheets are vertically suspended during the conversion process.

3 Claims, 1 Drawing Sheet

PROCESS FOR CERAMISING GLASS-CERAMIC SHEETS

BACKGROUND OF THE INVENTION

The present invention relates to a process and apparatus for ceramising planar, transparent glass-ceramic sheets.

Planar transparent glass-ceramic sheets are of great economic interest today. They are used, for example, as windows in ovens. When so used, their appearance and their transparency is very important.

Up to now, the ceramising process of planar transparent glass-ceramic sheets has been practiced while the sheets were supported on a substrate or while the sheets were transported on rollers. During the ceramising process, an intimate contact occurs between the heat-softened, glass-ceramic sheet and the substrate such that the resultant glass-ceramic sheet takes the form of the substrate.

In the above manner, the surface of the resultant glass-ceramic sheet takes the form of the substrate including any unevenness of the substrate as well as undesirable particles, such as small stones or dust.

During the ceramising process, the material shrinks approximately one percent. Such shrinkage causes undesirable cracks and scratches. Furthermore, prior processes produce sheets of insufficient strength.

SUMMARY OF THE INVENTION

Accordingly, it is an object of the present invention to provide a process of ceramising substantially-rectangular, transparent glass-ceramic sheets without significant surface imperfections.

Another object of the present invention is to provide a process for producing glass-ceramic sheets that have a higher degree of transparency than has been possible with prior processes.

An additional object of the present invention is to provide an improved process for producing glass-ceramic sheets with a greater strength than heretofore possible.

Another object of the present invention is to provide an improved process which employs less energy than prior processes.

Still another object of the present invention is to provide an improved process with a greater yield than heretofore possible.

BRIEF DESCRIPTION OF THE DRAWING

Other objects and advantages of the present invention will be apparent to those skilled in the art by reference to the following description and drawings wherein.

DESCRIPTION OF THE PREFERRED EMBODIMENTS

Figure 1:
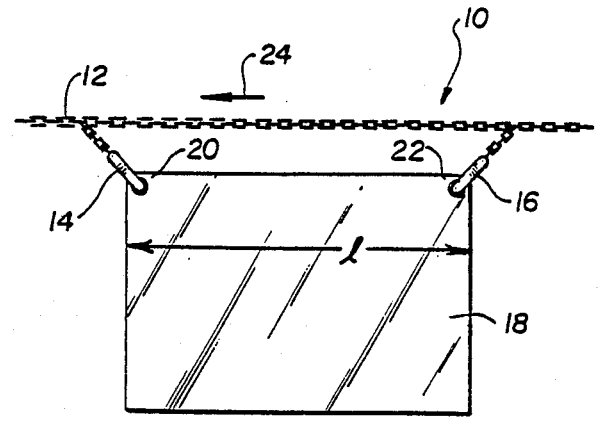
FIG. 1 is an elevation view of an apparatus suitable for practicing the process of the present invention.

According to the present invention, there is provided a process for ceramising planar, transparent substantially-rectangular glass-ceramic sheets by suspending the sheets vertically during the ceramising process.

The process of the present invention is advantageously carried out in a manner such that the sheets are vertically suspended, thereby creating a horizontal tensile stress. This horizontal tensile stress protects the sheets against bowing.

According to a preferred embodiment of the present invention, the sheets are suspended in the vicinity of their upper corners. In this manner, the sheets are suspended by suspension elements at two suspension points. One suspension point is in the vicinity of the upper left corner, whereas the other suspension point is in the vicinity of the upper right corner. These suspension elements create a tension that is inclined from the vertical.

These suspension elements are, in turn, connected to a holding and transport device.

It is necessary that the suspension elements at the upper corners of the sheet produce a force so large that the upper edge of the sheet is prevented from sagging during the ceramising process, since the viscosity of the glass-ceramic material during the process is severely reduced. This sagging of the sheets is inhibited by the above-described method of hanging.

In another embodiment of the present invention, tension can be created in the sheet in addition to that created by the suspension elements. This tension can be created in the vicinity of the rim, particularly in the area of the two lower corners. This tension helps to stabilize the sheet against bowing. To achieve this, tongs, loops and the like can be used with cables or chains over guide pulleys, with hanging weights or weights connected to levers and thereby caused to act on the edge of the sheet.

one apparatus suitable for practice of the present invention comprises:

(a) a horizontally arranged holding and transport device; and (b) suspension elements which are carried by the holding and transport device and are spaced a distance from each other greater than the length of one sheet.

In another embodiment of the present invention, tongs are employed as suspension elements. In this manner, the glass-ceramic sheets are maintained under tension. Holes are made in the sheets prior to the ceramising process. The sheets are attached to the holding and transport device by means of loops, screw bindings and the like which are attached in the holes.

When compared to prior processes, the process of the present invention has a number of advantages.

First, the resultant sheets are substantially free of surface imperfections. Furthermore, the sheets are free of scratches which in prior processes was caused by the shrinkage of the sheets.

Second, by minimizing the surface imperfections, there is an improvement in the degree of transparency; strenght is improved; and yield is increased.

Third, the process of the present invention employs less energy because it is no longer necessary to heat the substrate employed in prior processes to support the sheets during the ceramising process.

Referring now to the drawings in general, and in particular to FIG. 1, there is shown an apparatus 10 suitable for practicing the process of the present invention. The apparatus 10 comprises a horizontally disposed chain 12. Attached to the chain 12 are tongs 14, 16. The apparatus 10 carries a glass-ceramic sheet 18.

The tong 14 is connected to the sheet 18. The tong 14 is connected to the sheet 18 in the vicinity of its upper left corner 20. The tong 16 is connected to the sheet 18 in the vicinity of its upper right corner 22. The chain 12 can be moved by means (not shown) in the direction of the arrow 24.

In the apparatus 10, the chain 12 functions as both a holding element for the sheet 18 and as a transport element for the sheet 18. The chain 12 is maintained under tension. The sheet 18 has given length "l".

Figure 2:
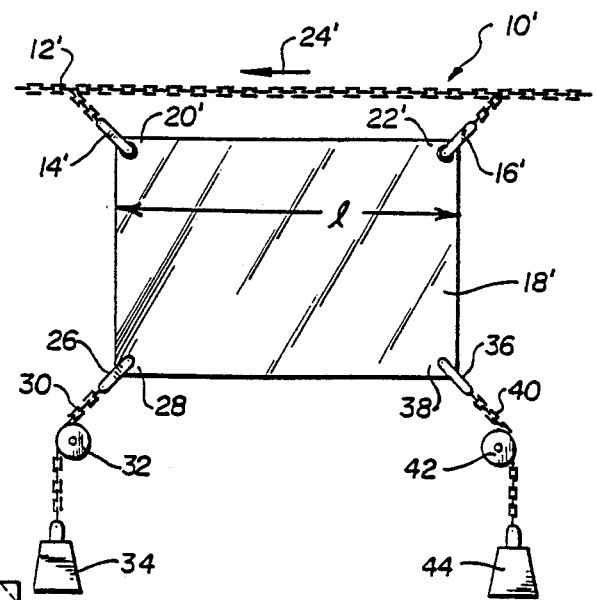
FIG. 2 is an elevation view of an alternate apparatus suitable for practicing the process of the present invention.

Referring now to FIG. 2, there is shown a modified apparatus 10' similar in many respects to the apparatus 10. A tong 26 is attached to a sheet 18' in the vicinity of the lower left corner 28. The tong 26 is attached to a chain 30 which travels over a pulley 32 and is attached to a weight 34.

Similarly, a tong 36 is attached in the vicinity of the lower right corner 38. The tong 36 is attached to a chain 40 which travels over a pulley 42 and is connected to a weight 44. The distance between the pulleys 32, 42 is greater than the length "l" of the sheet 18'. The apparatus 10' is also provided with means (not shown) for heating the glass-ceramic sheet 18' to the temperature at which it is connected to a glass sheet. The conversion occurs while the sheet 18' is vertically suspended from the tongs 14', 16', and while the sheet 18' is under the influence of a horizontal stress induced by the weights 34, 44 acting through the tongs 14', 16'.

Figure 3:
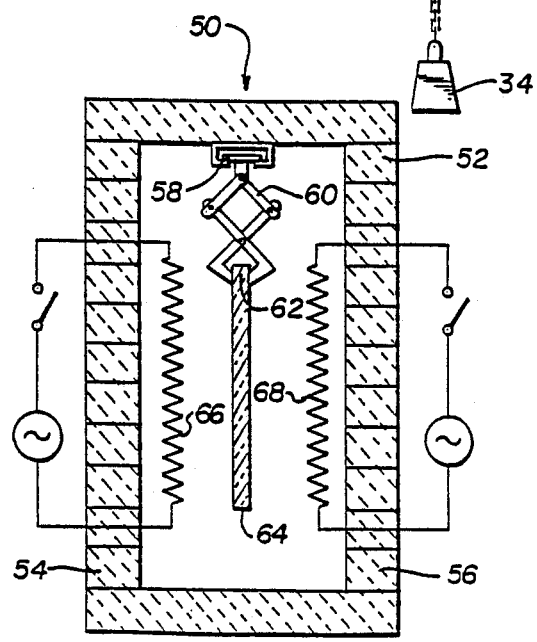
FIG. 3 is a sectional elevation view taken through an oven which represents an embodiment of an apparatus suitable for practicing the process of the present invention.

Referring now to FIG. 3, there is shown an apparatus 50 suitable for practicing the process of the present invention. The apparatus 50 comprises an oven 52. The oven 52 has massive walls 54, 56. The apparatus 50 is also provided with a chain 58 which can be moved by means not shown in a direction directly into the plane of the drawing. A hook 60 is attached to the chain 58. The hook 60 is attached to the upper adjacent corner 62 of a sheet 64 of glass-ceramic material. Between the sheet 64 and the wall 54 is a first heating element 66. Between the wall 56 and the sheet 64 is a second heating element 68. The heating elements 66, 68 are heated by means not shown and are employed to maintain the temperature of the oven 52 at the level at which the conversion into glass-ceramic takes place. The height of the heating elements 66, 68 is approximately the same as the height of the sheet 64.

It will be understood that modifications can be made in the above-described invention without departing from the scope thereof. For example, although FIG. 1 shows a single sheet 18 it will be understood that additional similar sheets can be attached to the chain 12. In FIG. 2, additional sheets can also be attached to the chain 12'. The additional sheets can be parallel to each other or can follow each other.

While the sheets have been described as rectangular, it will be appreciated that a square sheet is a particular form of a rectangular sheet and is within the scope of the present invention.

Although the above-described description refers to corners, it will be understood that these corners can be rounded.

What is claimed is:

1. A process for ceramising planar, transparent, substantially-rectangular sheets of glass-ceramic; comprising the steps of vertically suspending the sheets at their upper corners to provide a substantially horizontal tensile stress therein, and heating the vertically suspended sheets to a predetermined temperature to effect ceramising, whereby the substantially horizontal tensile stress inhibits sagging of the upper edges of the heated sheets.

2. The process of claim 1 wherein the sheets are vertically suspended at the upper corners thereof in a manner to create a laterally outward stretching thereof.

3. The process of claim 1 comprising the additional step of effecting laterally outward forces on the lower corners of the sheets to provide further substantially horizontal tensile stress therein.

* * * * *